United States Patent
Jubert et al.

(10) Patent No.: US 9,818,440 B1
(45) Date of Patent: Nov. 14, 2017

(54) HEAT ASSISTED MAGNETIC RECORDING SYSTEM HAVING AT LEAST THREE POSSIBLE MAGNETIC CONFIGURATIONS PER PHYSICAL BIT

(71) Applicant: HGST Netherlands B.V., Amsterdam (NL)

(72) Inventors: Pierre-Olivier Jubert, San Jose, CA (US); Michael Konrad Grobis, San Jose, CA (US); Richard Leo Galbraith, Rochester, MN (US); Roger William Wood, Gilroy, CA (US)

(73) Assignee: WESTERN DIGITAL TECHNOLOGIES, INC., Irvine, CA (US)

( * ) Notice: Subject to any disclaimer, the term of this patent is extended or adjusted under 35 U.S.C. 154(b) by 0 days.

(21) Appl. No.: 15/194,412

(22) Filed: Jun. 27, 2016

(51) Int. Cl.
*G11B 5/02* (2006.01)
*G11B 5/62* (2006.01)
*G11B 5/00* (2006.01)

(52) U.S. Cl.
CPC ........ *G11B 5/62* (2013.01); *G11B 2005/0021* (2013.01)

(58) Field of Classification Search
CPC . G11B 33/144; G11B 5/746; G11B 20/10388; G11B 2005/0021; G11B 5/74; G11B 5/743; G11B 7/2407; G11B 5/82; G11B 7/2405

USPC ....... 360/48, 77.08, 59, 313, 131; 369/13.26
See application file for complete search history.

(56) References Cited

U.S. PATENT DOCUMENTS

| | | | |
|---|---|---|---|
| 6,246,640 B1 * | 6/2001 | Shimazaki | G11B 11/10502 369/13.1 |
| 6,865,044 B1 | 3/2005 | Albrecht et al. | |
| 6,950,260 B2 | 9/2005 | Coffey et al. | |
| 7,974,031 B2 * | 7/2011 | Dobin | G11B 5/855 360/44 |
| 8,021,771 B2 | 9/2011 | Weller et al. | |
| 8,081,542 B1 | 12/2011 | Grobis et al. | |
| 8,092,704 B2 | 1/2012 | Balamane et al. | |
| 8,351,305 B2 | 1/2013 | Zhou et al. | |
| 8,619,514 B1 | 12/2013 | Matsumoto | |
| 8,675,456 B2 | 3/2014 | Zhu et al. | |
| 8,737,001 B2 * | 5/2014 | Chauhan | B82Y 10/00 360/48 |
| 8,842,503 B1 | 9/2014 | Rausch et al. | |
| 9,042,207 B2 | 5/2015 | Dakroub | |
| 9,053,722 B1 | 6/2015 | Burgos et al. | |
| 2005/0193405 A1 | 9/2005 | Hattori et al. | |
| 2015/0170699 A1 | 6/2015 | Dakroub et al. | |

* cited by examiner

*Primary Examiner* — Nabil Hindi
(74) *Attorney, Agent, or Firm* — Foley & Lardner LLP

(57) ABSTRACT

According to one embodiment, a heat assisted magnetic recording system includes a magnetic recording medium comprising a magnetic recording layer, where the magnetic recording layer includes a plurality of physical bits. Each physical bit has a perpendicular magnetic anisotropy and one of at least three magnetic states, where the at least three magnetic states include a +1 magnetic state, a 0 magnetic state, and a −1 magnetic state.

23 Claims, 14 Drawing Sheets

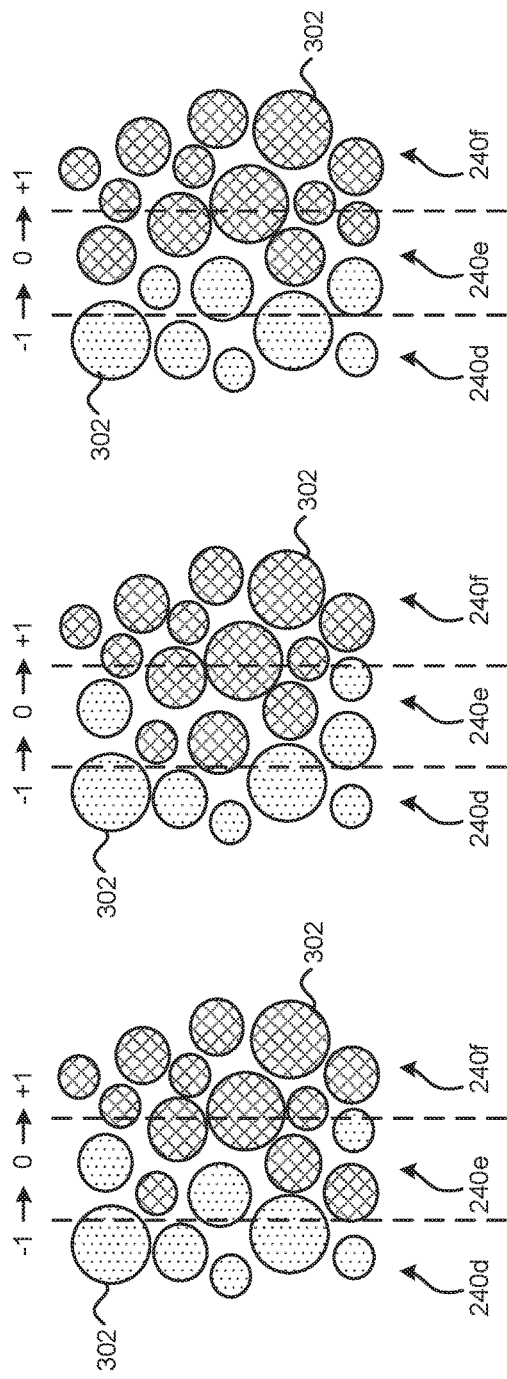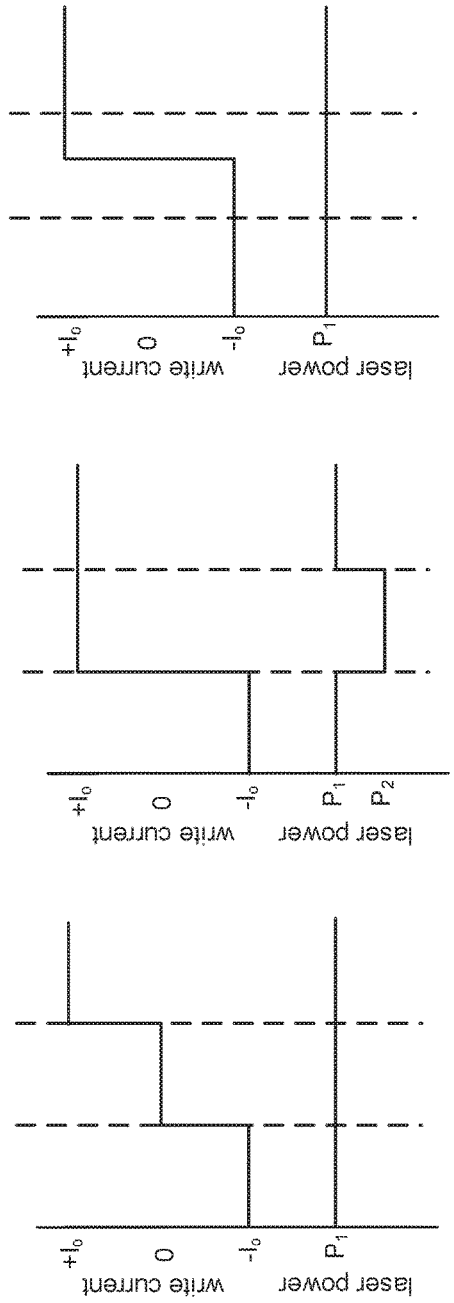
FIG. 7A  FIG. 7B  FIG. 7C

No SNR Gain

Bandwidth Gain

SNR Gain

| State | Signal | $I_o$ (mA) | $I_{laser}$ (mA) |
|---|---|---|---|
| 0 | -1.00 | -60 | 60 |
| 1 | -0.71 | -38 | 60 |
| 2 | -0.43 | -34 | 60 |
| 3 | -0.14 | -30 | 60 |
| 4 | 0.14 | 30 | 60 |
| 5 | 0.43 | 34 | 60 |
| 6 | 0.71 | 38 | 60 |
| 7 | 1.00 | 60 | 60 |

| State | Signal | I_wr (mA) | I_laser (mA) |
|---|---|---|---|
| 0 | -1.00 | -60 | 60 |
| 1 | -0.71 | -60 | 38 |
| 2 | -0.43 | -60 | 34 |
| 3 | -0.14 | -60 | 30 |
| 4 | 0.14 | 60 | 30 |
| 5 | 0.43 | 60 | 34 |
| 6 | 0.71 | 60 | 38 |
| 7 | 1.00 | 60 | 60 |

| State | Signal | I_wr (mA) | delay |
|---|---|---|---|
| 0 | -1.00 | 60 | 0 |
| 1 | -0.71 | 60 | 0.14 |
| 2 | -0.43 | 60 | 0.29 |
| 3 | -0.14 | 60 | 0.43 |
| 4 | 0.14 | 60 | 0.57 |
| 5 | 0.43 | 60 | 0.71 |
| 6 | 0.71 | 60 | 0.86 |
| 7 | 1.00 | 60 | 1 |

HEAT ASSISTED MAGNETIC RECORDING SYSTEM HAVING AT LEAST THREE POSSIBLE MAGNETIC CONFIGURATIONS PER PHYSICAL BIT

FIELD OF THE INVENTION

The present invention relates to data storage systems, and more particularly, this invention relates to a heat assisted magnetic recording (HAMR) system having at least three possible magnetic configurations (states) per physical bit.

BACKGROUND

The majority of the world's digital data is stored on a magnetic hard disk drive (HDD), which typically includes a rotating magnetic disk, a slider that has read and write heads, a suspension arm above the rotating disk, and an actuator arm that swings the suspension arm to place the read and/or write heads over selected circular tracks on the rotating disk. The slider body contains features on the media facing side (MFS) that create an air bearing that enables the slider to fly at a slight distance from the surface of the rotating disk. When the slider rides on the air bearing the write and read heads are employed for writing magnetic configurations to and reading magnetic signal fields from the rotating disk. The write and read heads are connected to processing circuitry that operates according to a computer program to implement the writing and reading functions.

The volume of information processing in the information age is increasing rapidly. Accordingly, an important and ongoing goal involves increasing the amount of information able to be stored in the limited area and volume of HDDs. Increasing the areal recording density capability (ADC) of HDDs provides one technical approach to achieve this goal. Methods to increasing the ADC of HDDs may involve improving components associated therewith (e.g., magnetic recording heads and/or magnetic media), improving system tolerances (e.g., servo systems), and improving data error correction schemes.

For example, one such method to increasing ADC involves reducing the size of the magnetic grains included within a magnetic recording layer. However, reducing the size of the magnetic grains may affect their thermal stability, thus leading to magnetization reversal and the loss of recorded data due to thermal fluctuations. The thermal stability of a magnetic grain is given by: $K_u V/k_b T$, where $K_u$ denotes the magnetic anisotropy constant of the magnetic recording material. V is the grain volume, $k_b$ denotes the Boltzmann constant, and T denotes the temperature. Preferably, the average $K_u V/k_b T$ needs to be larger than ~60 to avoid thermal decay of media magnetization and loss of customer data. To compensate for the reduction in volume, V, of the magnetic grain, the magnetic anisotropy ($K_u$) thereof may be increased to maintain thermal stability. A problem with increasing the magnetic anisotropy of the magnetic recording material is the accompanying increase in the magnetic anisotropy (and thus the coercivity) of the magnetic recording material, which may exceed the switching field (i.e., the write field) capability of the write head.

Heat assisted magnetic recording (HAMR), also referred to as thermally assisted magnetic recording (TAR), has emerged as a promising magnetic recording technique to address the difficulty in maintaining both the thermal stability and write-ability of the magnetic media. As the coercivity of the magnetic recording material is temperature dependent, HAMR employs heat to lower and eliminate the coercivity of a localized region of the magnetic media and write data therein. The data state becomes stored, or "fixed," upon cooling the magnetic media to well below the Curie temperature of the media (typically between 300° C. and 500° C.) in the applied field of the head. At normal drive operating temperatures, typically in a range between about 15° C. and 65° C.), the coercivity and $K_u V/k_b T$ of the media is sufficiently high, that the full head write field and thermal agitation does not degrade the magnetic states. Heating the magnetic media may be accomplished by a number of techniques such as directing electromagnetic radiation (e.g. visible, infrared, ultraviolet light, etc.) onto the magnetic media surface via focused laser beams and near field optical antennas. HAMR techniques may be applied to longitudinal and/or perpendicular recording systems, although the highest density storage systems are more likely to be perpendicular recording systems.

As indicated above, HAMR allows use of magnetic recording materials with substantially higher magnetic anisotropy and smaller thermally stable grains as compared to conventional magnetic recording techniques. Moreover, an additional approach to increase ADC may involve storing multiple data bits per physical bit. However, such an approach is difficult to employ in perpendicular magnetic recording media. For instance, while the use of multiple stacked magnetic recording layers has been proposed, the secondary (tertiary, etc.) layers are farther from the magnetic head, leading to low signal-to-noise ratio (SNR) and difficulties associated with independently addressing bits in the different layers.

SUMMARY

According to one embodiment, a heat assisted magnetic recording system includes a magnetic recording medium comprising a magnetic recording layer, where the magnetic recording layer includes a plurality of physical bits. Each physical bit has a perpendicular magnetic anisotropy and one of at least three magnetic states, where the at least three magnetic states include a +1 magnetic state, a 0 magnetic state, and a −1 magnetic state.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIGS. 7A-7C depict methods of writing −1, 0 and +1 magnetic states in physical bits of a HAMR system, according to various embodiments.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic recording storage systems and/or related systems and methods, as well as operation and/or component parts thereof.

In one general embodiment, a heat assisted magnetic recording system includes a magnetic recording medium comprising a magnetic recording layer, where the magnetic recording layer includes a plurality of physical bits. Each physical bit has a perpendicular magnetic anisotropy and one of at least three magnetic states, where the at least three magnetic states include a +1 magnetic state, a 0 magnetic state, and a −1 magnetic state.

Figure 1:
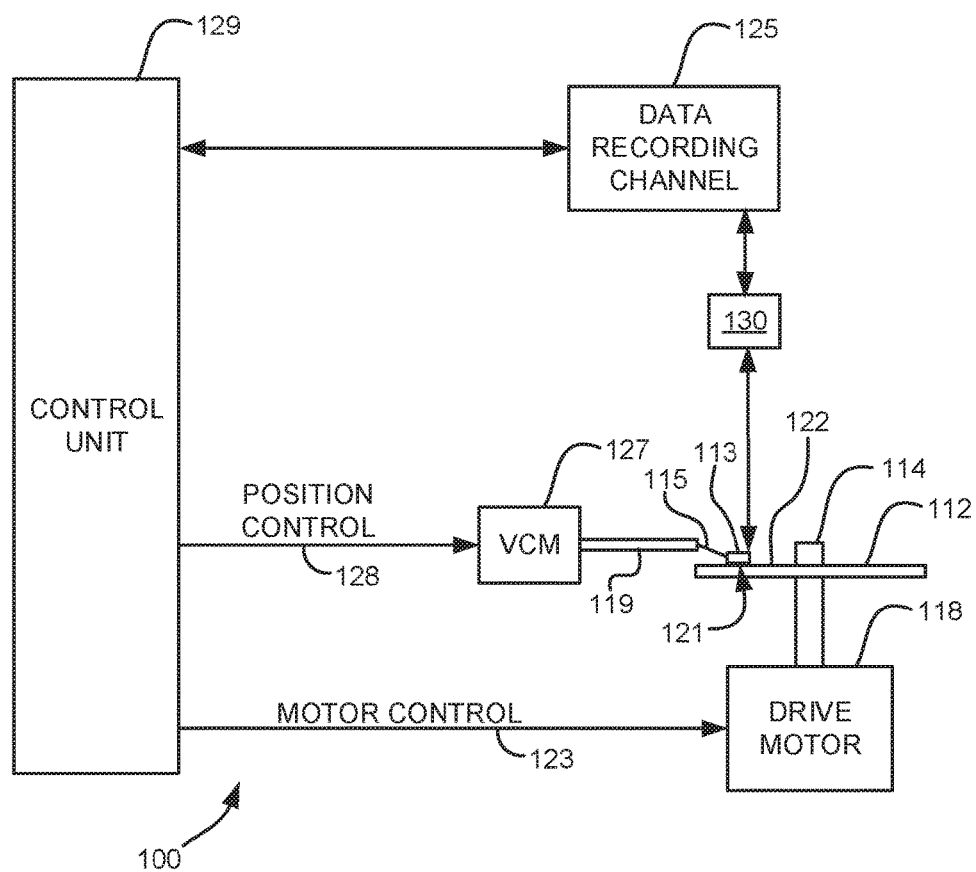
FIG. 1 is a simplified drawing of a magnetic recording disk drive system, according to one embodiment.

Referring now to FIG. 1, there is shown a disk drive 100 in accordance with one embodiment of the present invention. As an option, the disk drive 100 may be implemented in conjunction with features from any other embodiment listed herein, such as those described with reference to the other FIGS. Of course, the disk drive 100 may be used in various applications and/or in permutations which may or may not be specifically described in the illustrative embodiments listed herein. For instance, the disk drive 100 may include more or less components than those shown in FIG. 1, in various approaches. Moreover, unless otherwise specified, one or more components of the disk drive 100 may be of conventional material(s), design, and/or fabricated using conventional techniques (e.g., sputtering, plating, atomic layer deposition (ALD), chemical vapor deposition (CVD), etc.), as would become apparent to one skilled in the art upon reading the present disclosure.

As shown in FIG. 1, at least one rotatable magnetic medium (e.g., magnetic disk) 112 is supported on a spindle 114 and rotated by a drive mechanism, which may include a disk drive motor 118. The magnetic recording on each disk is typically in the form of an annular pattern of concentric data tracks (not shown) on the disk 112. Thus, the disk drive motor 118 preferably passes the magnetic disk 112 over the magnetic read/write portions 121, described immediately below.

At least one slider 113 is positioned near the disk 112, each slider 113 supporting one or more magnetic read/write portions 121, e.g., of a magnetic head according to any of the approaches described and/or suggested herein. As the disk rotates, slider 113 is moved radially in and out over disk surface 122 so that portions 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122. It is to be understood that a gas other than air, e.g. helium, may constitute the bearing between the slider 113 and disk surface 122, however for simplicity, this specification will refer to an air bearing.

The various components of the disk storage system are controlled in operation by control signals generated by controller 129, such as access control signals and internal clock signals. Typically, control unit 129 comprises logic control circuits, storage (e.g., memory), and a microprocessor. In a preferred approach, the control unit 129 is electrically coupled (e.g., via wire, cable, line, etc.) to the one or more magnetic read/write portions 121, for controlling operation thereof. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write portions 121 by way of recording channel 125. The recording channel contains circuitry that encodes the binary customer data and adds error correction bits to the sequence that is written to the disk. That channel also provides circuitry to equalize to readback signal, decode the readback data, and apply error correction schemes to correct for incorrectly written or readback bits. A preamplifier 130 is also present between the recording channel 125 and the read/write portions 121. The preamplifier contains signal conditioning and amplification circuitry for the read/write portions 121.

The above description of a magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

Regarding a magnetic head, an inductive write portion therein includes a coil layer embedded in one or more insulation layers (insulation stack), the insulation stack being located between first and second pole piece layers. A gap may be formed between the first and second pole piece layers by a gap layer at a media facing side (MFS) of the write portion. The pole piece layers may be connected at a back gap. Currents are conducted through the coil layer, which produce magnetic fields in the pole pieces. The magnetic fields fringe across the gap at the MFS for the purpose of writing bits of magnetic field information in tracks on moving media, such as in tracks on a rotating magnetic disk.

The second pole piece layer has a pole tip portion which extends from the MFS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

As discussed previously, the continual push to increase the areal recording density capability (ADC) of hard disk drives (HDDs) has led to the development of heat assisted magnetic recording (HAMR) techniques that utilize magnetic recording materials with substantially higher magnetic anisotropy (and thus small thermally stable grains) by localized heating of the magnetic recording materials above its Curie temperature, where anisotropy is reduced. Further approaches for increasing ADC utilize multilevel magnetic recording media in order to store multiple data bits per physical bit. However, such multilevel magnetic recording media is difficult to implement in a perpendicular magnetic recording medium, and is generally associated with low SNR and problems with bit addressability.

Embodiments disclosed herein are directed to increasing ADC, yet avoid the aforementioned drawbacks by providing HAMR systems configured to achieve at least three possible magnetic configurations/states per physical bit in a single magnetic recording layer of a magnetic recording medium. In some approaches, the HAMR systems disclosed herein may be configured to achieve a continuum of possible magnetic configurations/states per physical bit. As discussed in greater detail below, the magnetic states of the physical bit may arise from the distribution of magnetization directions of the magnetic grains in each bit.

Figure 2A:
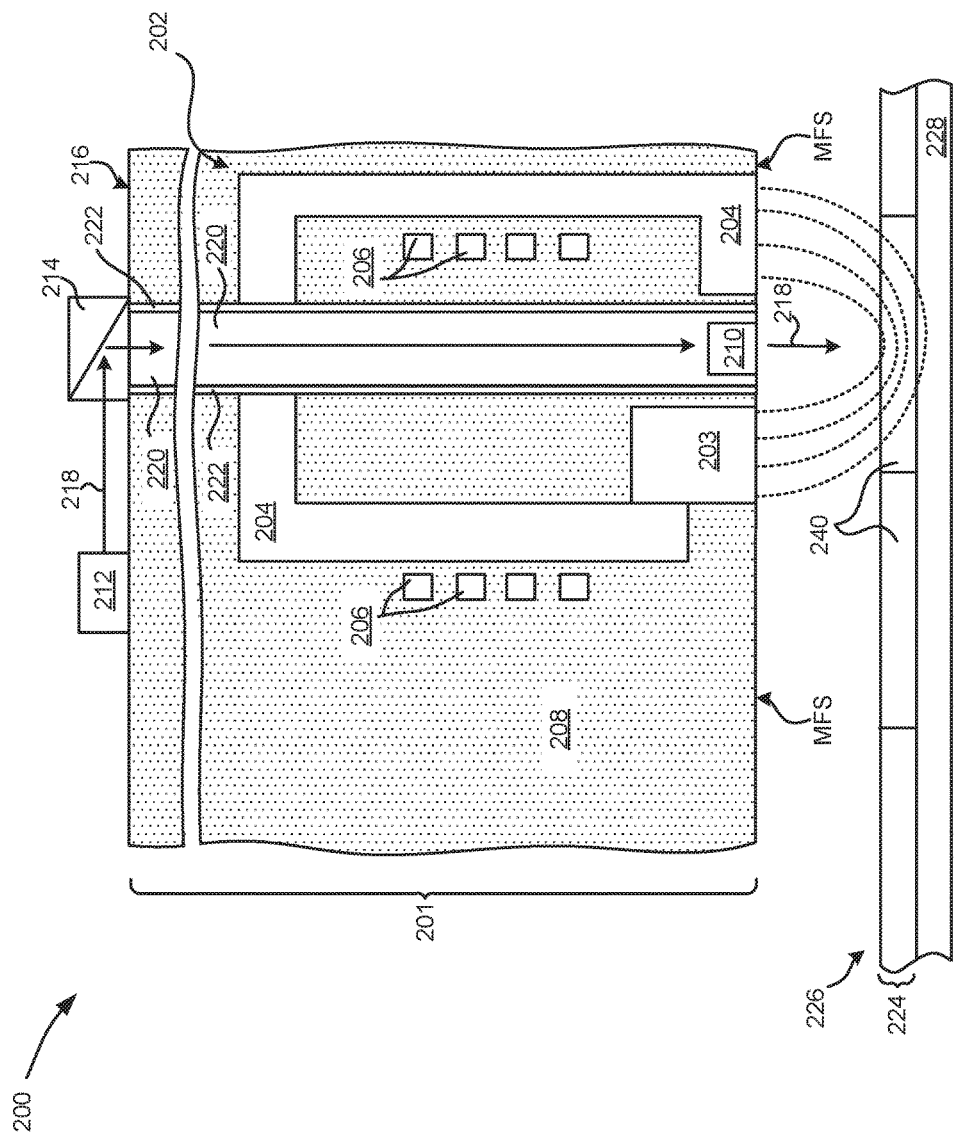
FIGS. 2A-2B are schematic representations of a write head and an adjacent magnetic recording medium configured for heat assisted magnetic recording (HAMR) operations, according to one embodiment.
Figure 2B:
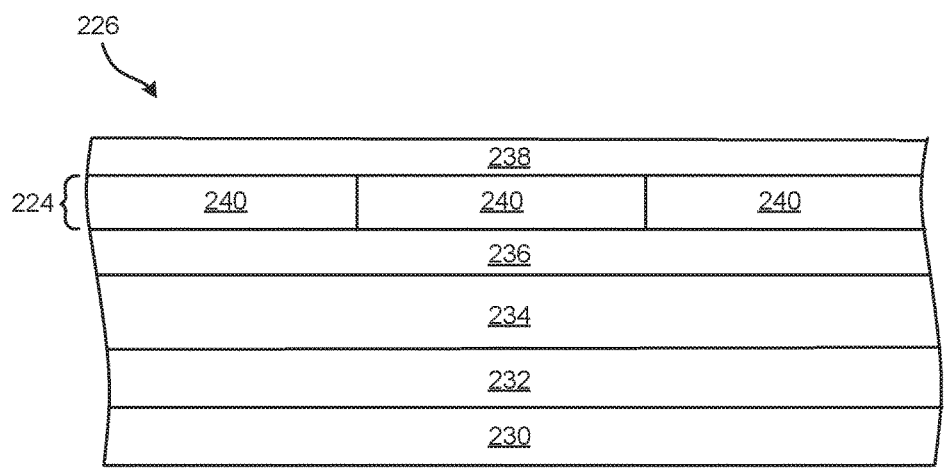

Referring now to FIGS. 2A-2B, a schematic of a heat assisted magnetic recording (HAMR) system 200 is shown, according to one embodiment. As an option, the HAMR system 200 may be implemented in conjunction with features from any other embodiment listed herein, such as those described with reference to the other FIGS. Of course, the HAMR system 200 and others presented herein may be used in various applications and/or in permutations which may or may not be specifically described in the illustrative embodiments listed herein. For instance, the HAMR system 200 may include more or less components than those shown in FIGS. 2A-2B, in various approaches. Moreover, unless otherwise specified, one or more components of the HAMR system 200 may be of conventional material(s), design, and/or fabricated using conventional techniques (e.g., sputtering, plating, atomic layer deposition (ALD), chemical vapor deposition (CVD), etc.), as would become apparent to one skilled in the art upon reading the present disclosure.

As shown in FIG. 2A, the HAMR system 200 includes a slider 201, which houses a write head 202. The write head 202 includes a main pole 203 coupled to a return pole 204, a portion of each of which are positioned at the media facing surface (MFS). The return pole 204 may include a conventional magnetic alloy or material. Exemplary materials for the return pole 204 include Co, Ni, Fe, Cr etc. and/or combinations thereof. Moreover, the main pole 203 may include any known suitable material, such as NiFe. CoFe, CoNiFe, CoFeCr, etc.

The write head 202 also includes write coils 206 positioned in a fill material 208 comprised of a conventional insulation layer (e.g., alumina) where said write coils 206 are configured to produce a magnetic field in the pole pieces associated therewith. The write coils 206 may also be of a helical type as known in the art. As would be appreciated by one skilled in the art, the writing of data (e.g., the switching of the magnetization direction of magnetic grains in a bit) occurs when the main pole 203 directs the magnetic write field to a bit that may be heated by the near field transducer 210.

As further shown in FIG. 2A, an optical radiation source 212 and an optical component 214 are operatively coupled to the upper surface 216 of the slider 201. In some approaches, the optical radiation source 212 and/or the optical component 214 may be in contact with the upper surface 216 of the slider 201. In other approaches, the optical radiation source 212 and/or the optical component 214 may be in contact with a separate component (e.g., a suspension component or a slider component) that is operatively coupled to the upper surface 216 of the slider 201.

The optical radiation source 212 may be configured to generate optical radiation 218 having a wavelength in a range from about 600 nm to about 1400 nm. In the non-limiting embodiment of FIG. 2A, the configuration of the optical radiation source 212 may be such that the generated optical radiation 218 propagates in a direction parallel (or substantially parallel) to the upper surface 216 of the slider 201. In another embodiment the optical radiation source 212 is configured such that optical radiation travels perpendicular (or substantially perpendicular) to the slider surface. The optical component 214 may therefore also be configured to direct the optical radiation 218 into an optical waveguide 220. In various approaches, the optical radiation source 212 may be a laser configured to operate in a pulsed or continuous mode. In more approaches, the optical component 214 may be a mirror, optical grating, or spot size converter. The optical component 214 may be a structure embedded under the top surface of the slider.

As also shown in the embodiment of FIG. 2A, the optical waveguide 220 may be configured to direct, in a direction perpendicular (or substantially perpendicular) to the upper surface 216 of the slider 201, the optical radiation 218 towards the NFT 210. The optical waveguide 220 preferably includes one or more materials having a high refractive index that assists in keeping the optical radiation 218 within the optical waveguide 220. Illustrative materials for the optical waveguide 220 include, but are not limited to, $TaO_x$, $TiO_x$, $NbO_x$, $ZrO_x$, $HfO_x$, $Ta_2O_5$, $TiO_2$, etc.

In yet more preferred approaches, the optical waveguide 220 may have an approximately uniform cross section along its height. The thickness of the optical waveguide 220 may be nominally between about 200 nm and about 400 nm. However, as well known in the art, the optical waveguide 220 may have a number of other possible designs including a planar solid immersion mirror or planar solid immersion lens which have a non-uniform core cross section along the waveguide's length. Thus, according to various approaches, the optical waveguide 220 may have any other cross sectional profile as selected by one of ordinary skill in the relevant art, such as a rectangular, square, triangular, circular, etc., cross section.

One or more cladding layers 222 may surround and be in contact with one or more portions of the optical waveguide 220. These one or more cladding layers 222 may preferably include a material having a low refractive index (relative to the material of the optical waveguide 220) so as to further assist in keeping the optical radiation 218 confined within the sidewalls of the optical waveguide 220. In general, a low refractive index material may include any material having a refractive index below about 1.75, but could be higher or lower depending on the desired embodiment. Illustrative materials for these one or more cladding layers 222 include, but are not limited to, $Al_2O_3$, $SiO_2$, etc. Moreover, in approaches where there are at least two cladding layers 222, said layers may include the same, similar or different materials as one another, depending on the desired embodiment.

In various approaches, the optical waveguide 220 and/or the cladding layer(s) 222 may span the entire height of the slider 201, i.e., from the upper surface 216 thereof to the MFS. In alternative approaches, the optical waveguide 220 and/or the cladding layer(s) 222 may span only a portion of the height of the slider 201.

As additionally shown in FIG. 2A, the NFT 210 may be located near or at the MFS of the slider 201. In some approaches, the NFT 210 may be within, operatively coupled to, or in direct contact with the optical waveguide 220. In other approaches, the NFT 210 may be located between the MFS and an output end face of the optical waveguide 220.

One exemplary configuration of the NFT 210 includes a nanobeak design. However, in other approaches, the NFT 210 may embody an E-antenna, have a triangular shape, be a lollipop NFT, etc., as desired. It is important to note that the partial cross-sectional view of the write head 201 in FIG. 2A is not meant to limit the structure of the NFT 210 as described herein. Examples of NFT designs may be found in U.S. Pat. Nos. 8,092,704, 8,619,514 and 9,053,722, the disclosures of which are herein incorporated by reference in their entirety.

The NFT 210 may comprise one or more low-loss metals (e.g., Au, Ag, Al, Cu, etc.) and/or be shaped in such a manner so as to concentrate the optical radiation 218 into a small, localized region on an adjacent magnetic medium 226. In particular, the metal material(s) and/or configuration of the NFT 210 may create resonant charge motion (surface plasmons) to yield an intense, localized evanescent electric field that emanates from the NFT 210 and penetrates into the magnetic recording layer 224 of the adjacent magnetic recording medium 226. The energy from the oscillating electric field is dissipated into heat in the media layers, raising the temperature of the recording layer 224. The peak temperature and in-plane width of the temperature contours in the recording layer will increase with increasing electric field intensity, and hence with increasing optical radiation source power.

While not shown in FIG. 2A, a plurality of electronic components may be associated with the write head 202, including, but not limited to, servo electronics, write electronics, data controller electronics, interface electronics, etc. For instance, the servo electronics may be configured to utilize servo information received from servo regions on the magnetic recording medium 226 to help position, e.g., the via the controller electronics, the write head 202. The interface electronics may be configured to communicate with a host system over an interface to pass data and command information, as well as communicate with the controller electronics over said interface. Data to be written to the magnetic recording medium 226 may be sent from the host to the interface and controller electronics, and ultimately to the write electronics. The write electronics may include a current source configured to provide a fixed write current ($I_o$) to the write coils 206. The write electronics may also include switching circuitry to generate bi-directional pulses with plus or minus write current ($I_o$) levels. The write current $I_o$ induces a substantially perpendicular magnetic write field ($H_w$) that emanates from the main pole 203 and returns back to the return pole 204. The polarity of the magnetic write field is dictated by the polarity of the write current through the write coil. The polarity may be switched based on a write clock whose frequency and phase are controlled to optimize the data write process.

While also not shown in FIG. 2A, a plurality of electrical components may also be associated with the optical radiation source 212. For instance, a current source may also be present to supply a current to the optical radiation source 212 for operation thereof. In preferred approaches, the optical radiation source 212 may be configured to provide multiple levels of output power. The output power of the optical radiation source 212 affects the power level at the NFT 210, which in turn affects the temperature at which the magnetic recording layer 224 of the magnetic medium 226 is heated via the NFT 210. The controller should contain circuitry to enable the timing of the changes in the write power to have a well-defined temporal relationship with the timing of the changes in the write coil current. The circuitry is further capable to adjust, or precompensate, the timing of changes in the write coil or laser power relative to a master clock.

With continued reference to FIG. 2A, the magnetic recording medium 226 includes a plurality of additional layers 228 below the magnetic recording layer 224. A more detailed view of the magnetic recording medium 226, and particularly of the additional layers 228, is presented in FIG. 2B for clarity. It is important to note, however, that the magnetic recording medium 226 may include more or less layers than those illustrated In FIG. 2B.

As shown in FIG. 2B, the magnetic recording medium 226 may include a substrate 230. The substrate 230 may include modern high temperature glass or other suitable materials that allow media deposition at elevated temperatures, e.g., on the order of about 600 to about 700° C.

The magnetic recording medium 226 may also include a seed layer 232 positioned above the substrate 230. The seed layer 232 may be configured to influence the epitaxial growth of the layers formed thereabove, and may include NiTa or other suitable seed layer material as would become apparent to one skilled in the art upon reading the present disclosure. The seed layer 232 may also have a single layer, or multilayer structure in some approaches.

As further shown in FIG. 2B, the magnetic recording medium 226 may include a heat sink layer 234 positioned above the seed layer 232. The heat sink layer 234 may be configured to dissipate heat generated during HAMR operations. Suitable materials for the heat sink layer 234 may include, but are not limited to, Cr, Cu, Au, Ag, W, Mo, Pt, etc. and alloys thereof such as CuX, AuX, AgX, etc. The heat sink layer 234 may have a single layer or multiple layer structure in some approaches. For instance, in one such approach, the heat sink layer 234 may be comprised of a pair of layers separated by a MgO layer, where the pair of layers each individually comprise one or more of Cr, Cu, Au, Ag, W, Mo, Pt, etc.

An optional soft magnetic underlayer 236 may additionally be positioned above the heat sink layer 234. The optional soft magnetic underlayer 236 may be configured to focus the magnetic flux from the magnetic head into the magnetic recording layer 224 in a direction generally perpendicular to the surface of the magnetic recording medium 226. Suitable materials for the optional soft magnetic underlayer 236 may include, but are not limited to, Fe, FeNi, Fe AlSi, FeTaN, FeN, FeCo, FeTaC, CoTaZr, CoFeTaZr, CoCuFe, CoFeB, CoZrNb, and/or other such magnetically permeable materials. The optional soft magnetic underlayer 236 may also include a single layer structure or a multilayer structure. For instance, in one such approach, the optional soft magnetic underlayer 236 may include a pair of soft magnetic layers separated by an antiferromagnetic coupling layer (e.g., including Ru), or separated by a nonmagnetic, electrically conductive film (e.g., Al, CoCr, etc.).

The magnetic recording medium 226 may also include one or more additional layers 238 above the magnetic recording layer 224. For example, in one approach, a protective overcoat may be positioned above the magnetic recording layer 224, and be configured to protect the underlying layers from wear, corrosion, etc. This protective overcoat may include diamond-like carbon, carbon nitride, Si-nitride, BN or B4C, etc. and/or other materials suitable for a protective overcoat as would become apparent to one having skill in the art upon reading the present disclosure. In more approaches, a lubricant layer may be positioned above the magnetic recording layer 224, and particularly above the protective overcoat. The material of the lubricant layer may include, but is not limited to, perfluoropolyether, fluorinated alcohol, fluorinated carboxylic acids, etc., and/or other suitable lubricant as would become apparent to one having skill in the art upon reading the present disclosure.

As shown in FIGS. 2A-2B, the magnetic recording medium 226 includes a magnetic recording layer 224, which preferably has a single layer structure. The magnetic recording layer includes a plurality of physical bits 240, each bit 240 including one or more magnetic grains therein. Each bit 240 may preferably include a high perpendicular anisotropy magnetic material. Suitable magnetic material that provides a high perpendicular anisotropy may include, but is not limited to, CoPt, CoPd, FePt, FePd, $CoPt_3$, $Co_3Pt$, $CoPd_3$, $Co_3Pd$, CoPtCr, combinations thereof, and/or other suitable chemically ordered alloy(s) based on the CoPt and FePt $L1_0$ phase. In more approaches, each bit 240 may also be formed of one or more amorphous materials that exhibit perpendicular magnetic anisotropy including, but not limited to, TbFe, TbFeCo, CoSm, GdFe, etc.

In preferred approaches, each bit 240 may comprise a chemically ordered $L1_0$ FePt alloy. A chemically-ordered $L1_0$ FePt alloy, in its bulk form, is known as a face-centered tetragonal (FCT) $L1_0$-ordered phase material (also called a CuAu material). The c-axis of the $L1_0$ phase is the easy axis of magnetization and is oriented perpendicular to the surface of the magnetic recording layer 224. In more approaches, each bit 240 may comprise a $L1_0$ FePtX alloy, where X is present in an amount ranging from about 1 at. % to about 20 at. % and is a material configured to optimize (e.g., reduce) the magnetic anisotropy and/or Curie temperature associated with the magnetic recording layer 224. Suitable materials for X may include, but are not limited to, Ag. Cu, Au, Ni, Mn, Pd, and other such materials that would become apparent to one skilled in the art upon reading the present disclosure.

In the magnetic recording layer 224, the bits 240 may be physically adjacent to one another, where each bit 240 may be composed of a plurality of neighboring magnetic grains in a region on the medium, where the bit is written by a write head and decodable by reading circuitry of the system, e.g., using a read head. The magnetic state of each bit 240 may thus correspond to the distribution of the magnetization directions of the magnetic grains therein. For instance, in some approaches, each bit 240 may achieve one of two possible magnetic states, denoted the +1 and −1 magnetic states. The +1 and −1 magnetic states arise where the majority of the magnetic grains in a bit 240 have a single polarization. Specifically, the +1 magnetic state arises where the majority of the magnetic grain magnetizations in a bit 240 are oriented in a first direction perpendicular to (out-of-the-plane of) the magnetic recording layer 224. The −1 magnetic state arises where the majority of the magnetic grain magnetization in a bit 240 are oriented in a second direction perpendicular to (out-of-the-plane of) the magnetic recording layer 224, the second direction being opposite/antiparallel to the first direction.

Figure 3:
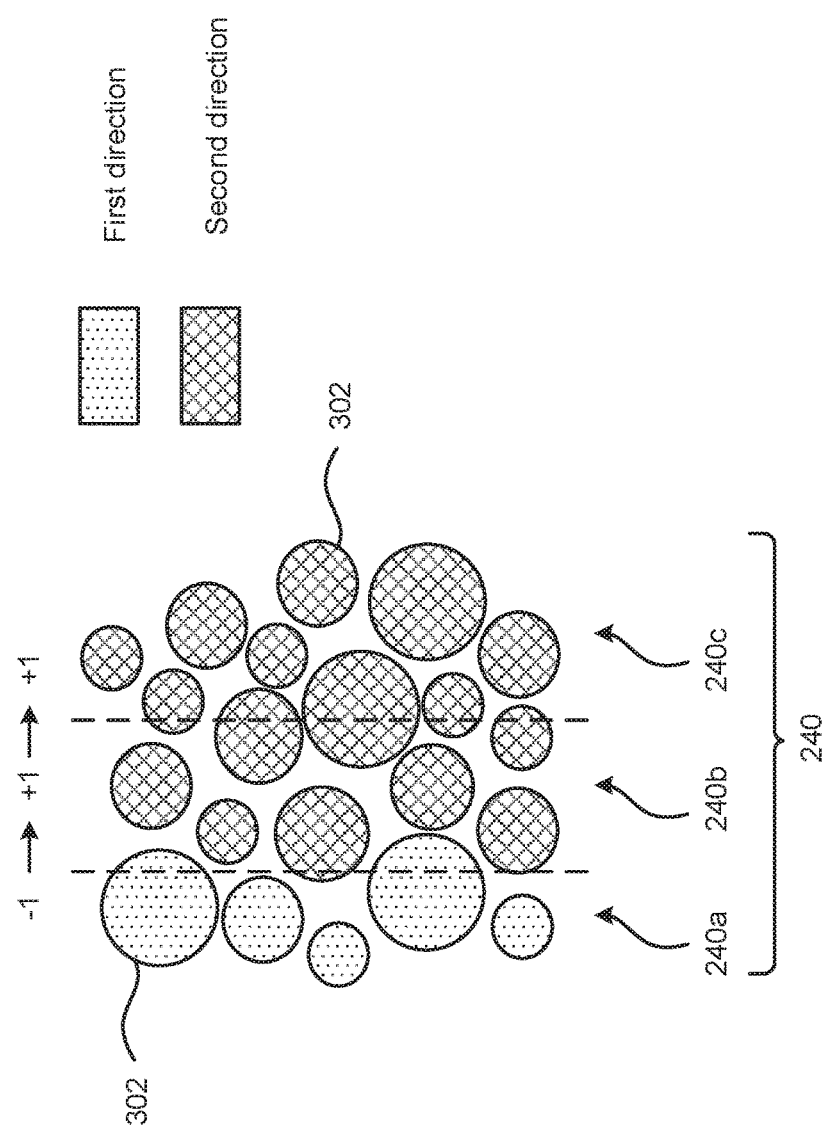
FIG. 3 is a schematic representation of physical bits having a +1 or −1 magnetic state, according to one embodiment.

FIG. 3 depicts an exemplary embodiment in which bits 240 of the magnetic recording layer 224 have either a +1 or −1 magnetic state. As particularly shown in FIG. 3, at least the majority of the magnetic grains 302 in the bit designated 240a have a magnetization oriented in a first direction perpendicular to (out-of-the-plane of) the magnetic recording layer 224. Conversely, at least the majority of the magnetic grains 302 in the bits designated 240b and 240c have a magnetization oriented in a second direction perpendicular to (out-of-the-plane of) the magnetic recording layer 224 and opposite/antiparallel to the first direction. For reference purposes only, a −1 magnetic state and a +1 magnetic state of a bit correspond to configurations in which at least the majority of the magnetic grains therein have a magnetization oriented in the first direction and the second direction, respectively.

The writing process to generate the −1 magnetic state in bit 240a via the HAMR system 200 (particularly via the write head 201 thereof) requires provision of a negative write current ($-I_o$) to the write coils 206 for induction of a write field ($H_w$) having a first polarity. Writing the −1 magnetic state in bit 240a additionally requires the optical radiation source 212 to operate at a normal to high output power level (denoted $P_1$ for reference) that enables the NFT 210 to heat the grains 302 in bit 240 to near or above the Curie temperature thereof. Similarly, the writing process to generate the +1 magnetic state in bits 240b and 240c (located in the down-track direction relative to bit 240a) requires provision of a positive write current (+$I_o$) to the write coils 206 for induction of a write field ($H_w$) having a second polarity (opposite that of the first polarity), in combination with provision of output power level $P_1$ to the NFT 210. The cross track extent of the written bit is largely determined by the magnitude of the output power level. Larger optical powers will create larger thermal spots and more grains will be recorded in the cross track direction. The down-track width of the bit is determined by the temporal frequency of changes in the write polarity.

Figure 4:
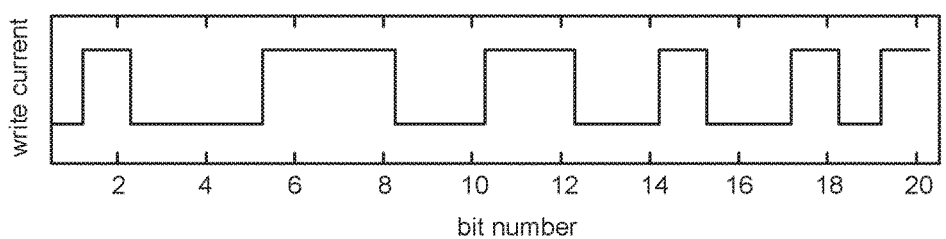
FIG. 4 depicts a plot of write current versus bit number for a writing process that generates +1 and −1 magnetic states.
Figure 5:
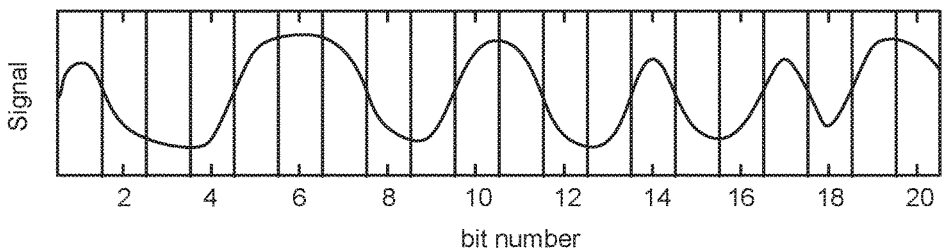
FIG. 5 depicts a plot of the readback waveform versus bit number for physical bits having a +1 or −1 magnetic state.

FIG. 4 illustrates a plot of the write current versus bit number for a writing process that generates +1 and −1 magnetic states. FIG. 5 illustrates a plot of the readback waveform versus bit number for physical bits having a +1 or −1 magnetic state.

Again with reference to FIGS. 2A-2B, each bit 240 may achieve one of at least three possible magnetic states, in preferred approaches. These three magnetic states include the +1 and −1 magnetic states as described above, along with at least one additional magnetic state denoted the 0 magnetic state. A bit 240 having a 0 magnetic state corresponds to a demagnetized physical bit in which the number of magnetic grains having a magnetization oriented in the first direction perpendicular to (out-of-the-plane of) the magnetic recording layer 224 is about equal to the number of magnetic grains having a magnetization oriented in the second direction perpendicular to (out-of-the-plane of) the magnetic recording layer 224, the first and second directions again being opposite/antiparallel to one another. Stated another way, a 0 magnetic state arises where there is about a 50/50 distribution of magnetic grain magnetizations oriented in the first direction and magnetic grain magnetizations oriented in the second direction.

Figure 6:
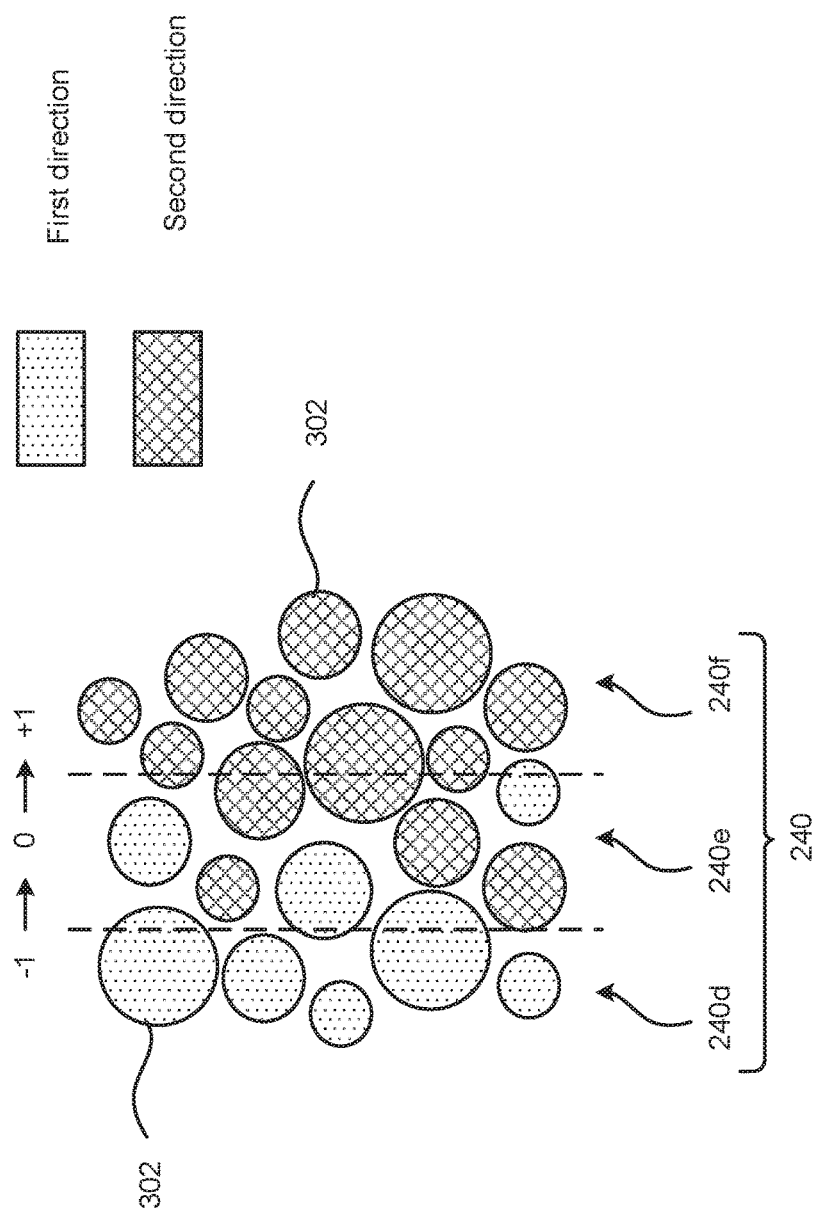
FIG. 6 is a schematic representation of physical bits having a +1, 0 or −1 magnetic state, according to one embodiment.

FIG. 6 depicts an exemplary embodiment in which the bits 240 of the magnetic recording layer 224 have either a +1, −1 or 0 magnetic state. As particularly shown in FIG. 6, at least the majority of the magnetic grains 302 in the bit designated 240d have a magnetization oriented in the first direction perpendicular to (out-of-the-plane of) the magnetic recording layer 224; whereas, at least the majority of the magnetic grains 302 in the bit designated 240f have a magnetization oriented in the second direction perpendicular to (out-of-the-plane of) the magnetic recording layer 224 and opposite/antiparallel to the first direction. Regarding the bit designated as 240e, approximately 50% of the magnetic grains 302 therein have a magnetization oriented in the first direction, and approximately 50% of the magnetic grains 302 therein have a magnetization oriented in the second direction. It is of note that bit 240e is located in the down track direction relative to bit 240d, and bit 240f is located in the down-track direction relative to bit 240e.

FIGS. 7A-7C illustrate exemplary methods of writing the −1, 0 and +1 magnetic states in physical bits 240d-240f of a HAMR system (such as the HAMR system 200 of FIGS. 2A-2B), according to various approaches. The methods depicted in FIG. 7A-7C utilize the same process as one another to generate the −1 magnetic state in bit 240d. For instance, the −1 magnetic state of bit 240d may be generated when a negative write current (−$I_o$) is provided to the write coils 206 to produce a write field ($H_w$) having a first polarity, while the optical radiation source 212 associated with the slider 201 is on and operating at the aforementioned P1 output power level to enable the NFT 210 to heat the grains 302 in bit 240d to near or above its Curie temperature.

The methods depicted in FIG. 7A-7C also utilize the same process as one another to generate the +1 magnetic state in bit 240f. For example, generation of the +1 magnetic state of bit 240f may involve provision of a positive write current (+$I_o$) to the write coils 206 for production of a write field ($H_w$) having a second polarity, in combination with provision of output power level $P_1$ to the NFT 210 so as to heat the grains 302 in bit 240f to near or above its Curie temperature.

It is of note, however, that the methods depicted in FIGS. 7A-7C differ with respect to the generation of the 0 magnetic state of bit 240e. In the method shown in FIG. 7A, the 0 magnetic state of bit 240e may be generated when the write current is zero ($I_o$=0), yet the optical radiation source 212 remains on and operates at the aforementioned P1 output power level to enable the NFT 210 to heat the grains 302 in bit 240e to near or above the Curie temperature thereof. As the temperature of the grains 302 in bit 240e reaches and exceeds its Curie temperature, the ferromagnetic material therein becomes paramagnetic with negligible magnetic and anisotropy energy in the absence of field. As the temperature of the grains 302 in bit 240e falls below its Curie temperature, the magnetic moment of the grains returns and the magnetization directions of the magnetic grains therein once again become aligned parallel or anti-parallel with one another. In the absence of a substantial magnetic field from the write head 202, the demagnetization fields of the grains themselves will favor a configuration such that approximately 50% of the magnetic grains having a magnetization oriented in the first direction perpendicular to the magnetic recording layer 224, and approximately 50% of the magnetic grains having a magnetization oriented in the second direction perpendicular to the magnetic recording layer 224 and opposite/antiparallel to the first direction.

In the method shown in FIG. 7B, the 0 magnetic state of bit 240e may be generated by setting the write current to the opposite write current value used to generate the previously written bit (e.g., bit 240d) and simultaneously reducing the optical radiation power so that the cross-track write of the bit is roughly half of the nominal bit width. For instance, as shown in the embodiment of FIG. 11B, generation of the 0 magnetic state in bit 240e requires a positive write current (+$I_o$) because a negative write current (−$I_o$) was used to generate the −1 magnetic state in previously written bit 240d. It is of note that in alternative approaches where bit 240d has a +1 magnetic state (generated using a positive write current (+$I_o$)), generation of the 0 magnetic state in bit 240e would thus require a negative write current (−$I_o$).

As additionally shown in FIG. 7B, generation of the 0 magnetic state in bit 240e also requires the optical radiation source 212 to be on, yet operating at a lower power level (designated $P_2$ for reference) as compared to the power level (e.g., $P_1$) used to write the previous bit (e.g., bit 240d). While power level $P_2$ is lower than that of $P_1$, the optical radiation source 212 operating at $P_2$ still enables the NFT 210 to heat the bit 240e to near or above the Curie temperature thereof. In various approaches, $P_2$ may correspond to a power level ranging from about 50% to about 90% of the $P_1$ power level.

A decrease in the power level of the optical radiation source 212 decreases the thermal spot produced by the NFT 210, and ultimately leads to a decrease in write width. This reduction in power level is accompanied by provision of write current opposite to that used to generate the previously written bit, as discussed above. Accordingly, as shown in the embodiment of FIG. 7B, the write head 201 will thus be writing over a smaller region in bit 240e in the presence of a positive write current, thereby changing the magnetization direction of the magnetic grains in this smaller region to correspond to the second direction. Given that the remaining regions of bit 240e have magnetic grains with magnetizations oriented in the first direction, a 0 magnetic state is achieved. Generating a +1 magnetic state in subsequent bit 240f may then proceed by increasing the power level of the optical radiation source 212 to $P_1$ and continuing to use a positive write current (or alternatively using negative write current if a −1 magnetic state in bit 240f is desired).

In the method shown in FIG. 7C, the 0 magnetic state of bit 240e may be generated by switching the phase of the write current (and thus the polarity of the induced magnetic write field, $H_w$) in about the middle of bit 240e. Stated another way, the write current may be half clocked to generate the 0 magnetic state of bit 240e. As also shown in FIG. 7C, generation of the 0 magnetic state in bit 240e additionally requires that the optical radiation source 212 is on and operating at the $P_1$ output power level to enable the NFT 210 to heat the bit 240e to near or above the Curie temperature thereof.

It is important to note, however, that implementing the method of FIG. 7C to write the 0 magnetic state is limited to approaches where a transition is made from a −1 magnetic state to a +1 magnetic state and vice versa. As such, implementing the method of FIG. 7C may only result in the generation of −1, 0 and +1 magnetic states in bits 240d, 240e, and 240f respectively, or the generation of +1, 0 and −1 magnetic states in bits 240d, 240e, and 240f respectively.

Figure 8:
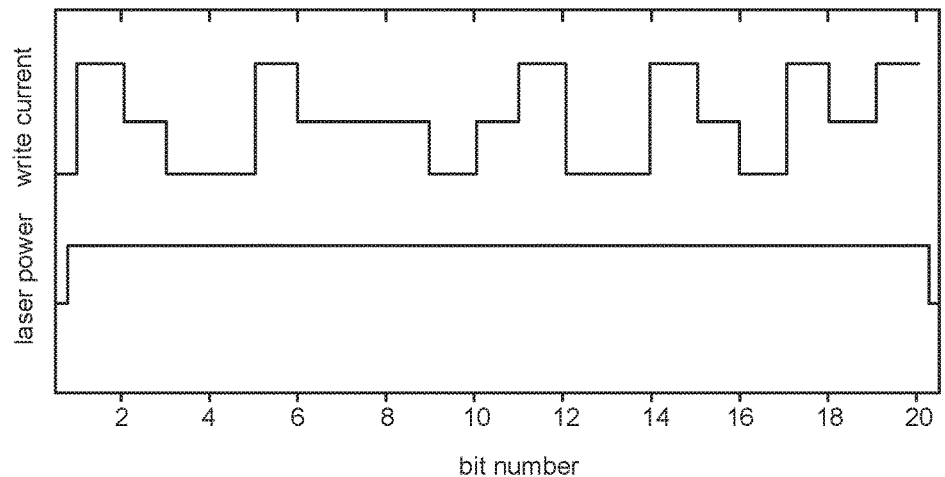
FIG. 8 depicts a plot of write current versus bit number for a writing process that generates +1, 0 and −1 magnetic states.
Figure 9:
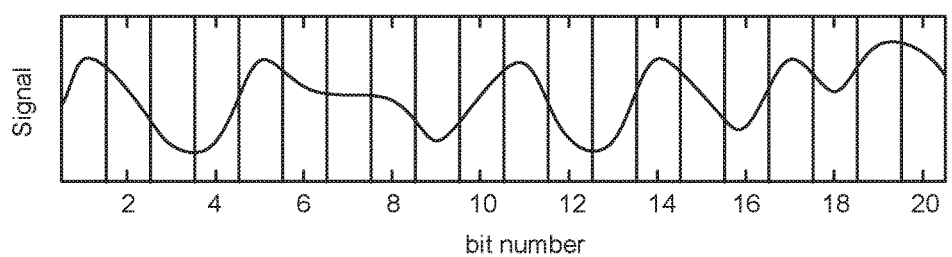
FIG. 9 depicts a plot of the readback waveform versus bit number for physical bits having a +1, 0 or −1 magnetic state.

Referring now to FIG. 8, a plot of the write current versus bit number is illustrated for a writing process that generates +1, 0 and −1 magnetic states. FIG. 9 illustrates a plot of the readback waveform versus bit number for physical bits having a +1, 0 or −1 magnetic state.

Figure 10:
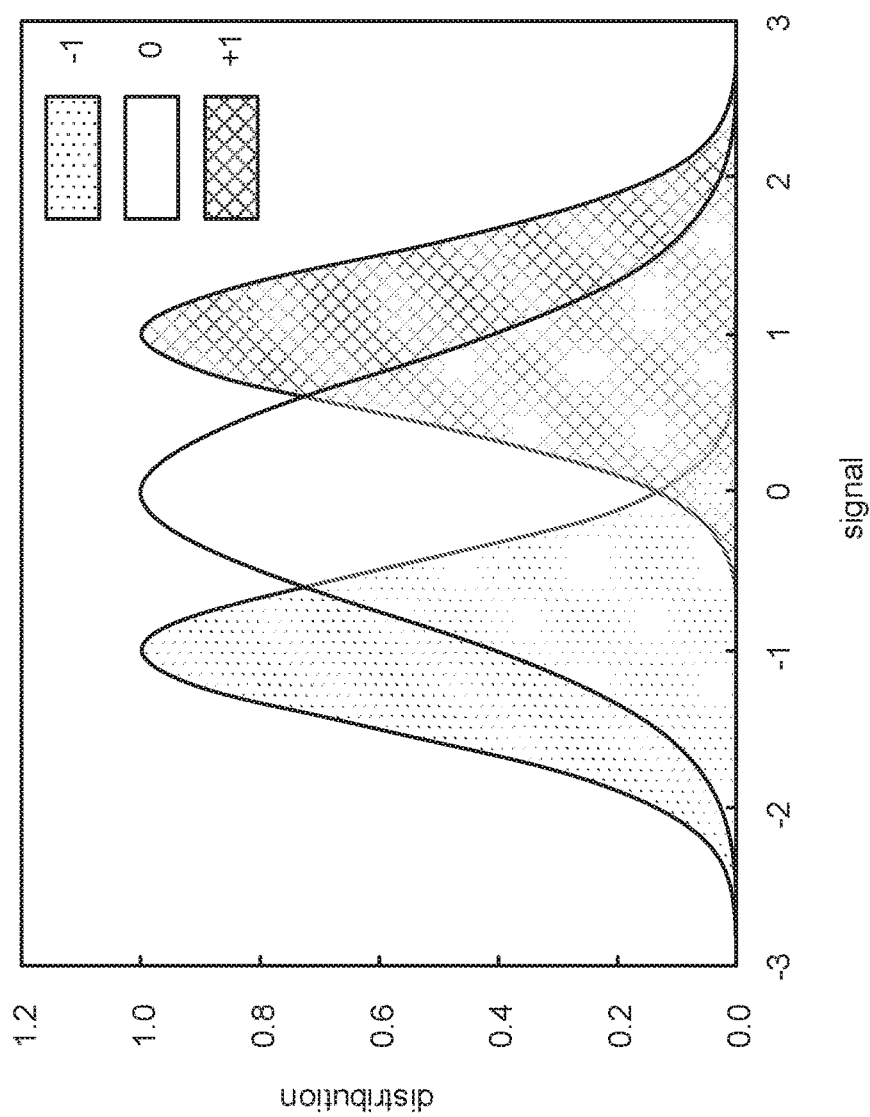
FIG. 10 depicts a plot of the signal distribution of −1, 0 and +1 magnetic states.

Referring now to FIG. 10, a plot of the signal distribution of the −1, 0 and +1 magnetic states is shown. It has been found that demagnetization fields make a nearly equal distribution of magnetic grain polarity (i.e. a 50/50 distribution of magnetic grain magnetizations oriented in the first direction and magnetic grain magnetizations oriented in the second direction) energetically favorable. Moreover, a HAMR recording system having at least three possible magnetic states per physical bit may achieve an ADC gain of log(3)/log(2), or ~60%.

Statistical fluctuations in the writing process, reading process, and/or grain quantization noise may cause larger signal variation for bits having a 0 magnetic state in some approaches. As the 0 magnetic state is about half the signal of the +1 and −1 magnetic states, the 0 magnetic state may intrinsically have lower signal-to-noise (SNR) and thus be harder to detect correctly. For example, adding the 0 magnetic state whose signal falls in between the −1 and +1 magnetic states may lead to instances in which the 0 magnetic state is falsely detected, and interfere with detection of the −1 and +1 magnetic states.

Accordingly, an encoding scheme may be applied to user data sequences (i.e., user bit sequences) to maintain a low bit error rate (BER) and achieve the high ADC gain from use of three possible magnetic states per physical bit, in various approaches. Certain data sequences may be difficult to write onto a magnetic recording medium, and often cause errors when the data sequences are read back. For instance, long sequences of consecutive bits having the same polarity, and long sequences of alternating polarity bits are examples of data sequences that may be prone to errors. To eliminate error prone data sequences, user data sequences may first be encoded into code word sequences before being written to the magnetic recording medium, where such code word sequences are preferably limited to a subset that restricts certain bit sequences.

Figure 11A:
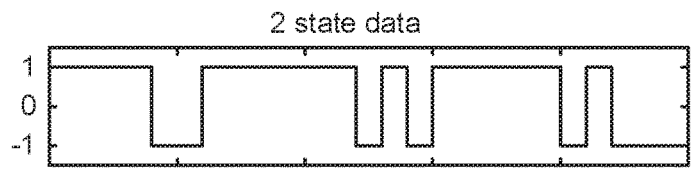
FIGS. 11A-11D depict several encoding schemes (e.g., a naïve 2 magnetic state encoding scheme, a naïve 3 magnetic state encoding scheme encoding scheme, a MLT-3 (multi-level transmit) encoding scheme, and MLT-3 symbol swap encoding scheme) that may be implemented in a HAMR system, according to various embodiments.
Figure 11B:
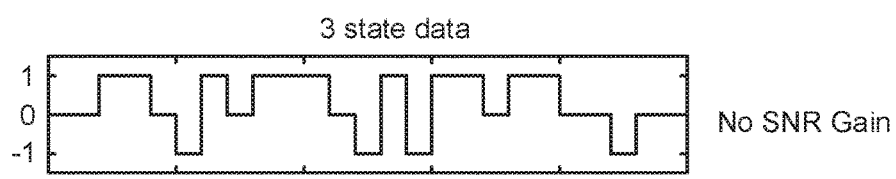

FIGS. 11A-11D illustrate several encoding schemes that may be implemented in the HAMR systems disclosed herein, in various approaches. These schemes can be used in conjunction with other error-correction and encoding schemes. The discussion of the embodiments assumes that the original form of the customer data stored on the HDD is binary in nature (e.g. either a 1 or 0 bit value). FIG. 11A illustrates a naïve 2 magnetic state encoding scheme, in which binary data is represented by two magnetic states in the medium (i.e. two states having opposite/antiparallel magnetization directions as one another). During readback, the voltage in the readback waveform follows the media magnetization, which enables the stored bit values to be deduced from by detecting the polarity of the magnetization state of the media during the readback bit clock interval.

Similar to that of FIG. 11A. FIG. 11B illustrates a naïve 3 magnetic state encoding scheme. Here the binary customer data can be encoded in a trinary data stream, in which, for example, N 2-state binary bits are encoded as M 3-state trinary bits, with N/M≤log(3)/log(2). The best case of equality is nearly achieved when N=19 and M=12. The three trinary bits (e.g., a +1, 0 and −1) are represented by three different magnetic states in the media (i.e. two states having opposite/antiparallel magnetization directions as one another, and a third state having magnetizations distributed about equally among the two polarizations). It has been found that implementation of the naïve 3 magnetic state encoding scheme does not result in any SNR gain. Rather, while an ADC gain of about 60% may be achieved in HAMR systems using three possible magnetic states per physical bit, implementation of the naïve 3 magnetic state encoding scheme degrades the BER, and may thus only be useful in systems having excess SNR. An excess SNR can occur if the linear density of the recorded transitions cannot be increased due to bandwidth constraints.

Figure 11C:
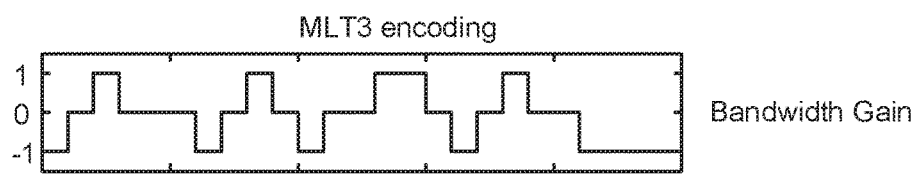

FIG. 11C illustrates a MLT-3 (multi-level transmit) encoding scheme in which three bit values (denoted −1, 0, and +1) are used. The MLT-3 encoding scheme encodes binary data by cycling sequentially through the bit values −1, 0, +1, 0 by transitioning to the next bit value to transmit a "1" bit, and remaining at the same voltage value to transmit a "0" bit. The MLT-3 encoding scheme requires 4 transitions to complete a full cycle, thus decreasing the high frequency content of the signal and resulting in a bandwidth gain.

Figure 11D:
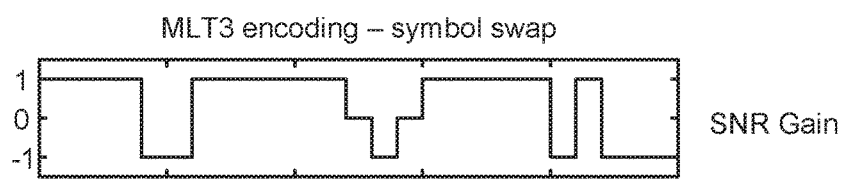

FIG. 11D illustrates a 3-state encoding scheme utilizing a symbol swap process, which we denote as MLT-3s. This MLT-3s process substitutes predetermined binary bit sequences, that are prone to write or readback errors, with a trinary bit sequence that has higher SNR. In particular approaches, a 1.5T trinary symbol, such as the sequence 1 0 −1 0 1 or −1 0 1 0 −1, may be used in place of high error sequences, such as the IT binary sequence 1 0 1 0 1 or 0 1 0 1 0. Implementation of the MLT-3s process results in SNR gain, rather than coding gain, that can be translated to ADC gain by increasing linear or track density.

Figure 12:
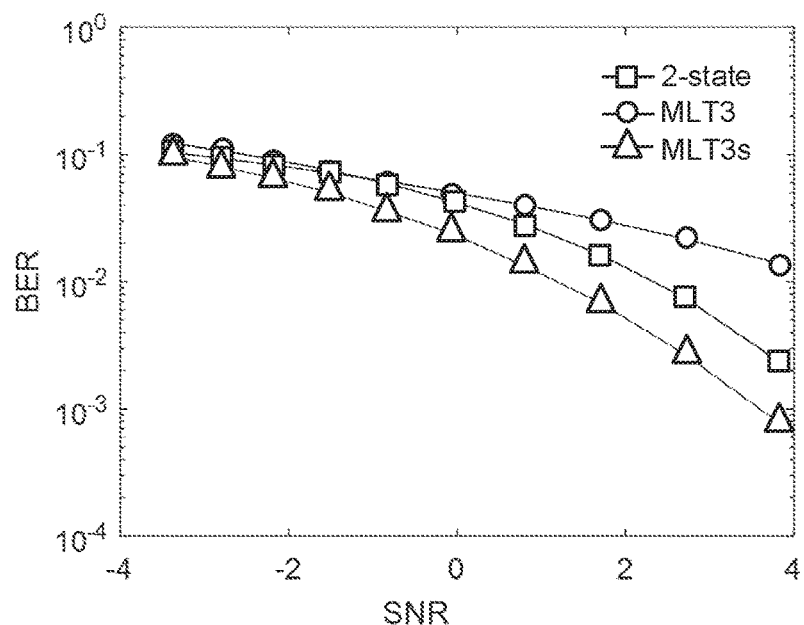
FIG. 12 depicts a plot of the bit error rate (BER) versus signal-to-noise (SNR) for naive 3-state, MLT-3 and MLT-3s encoding schemes (described in FIGS. 11B-11C, respectively).
Figure 13:
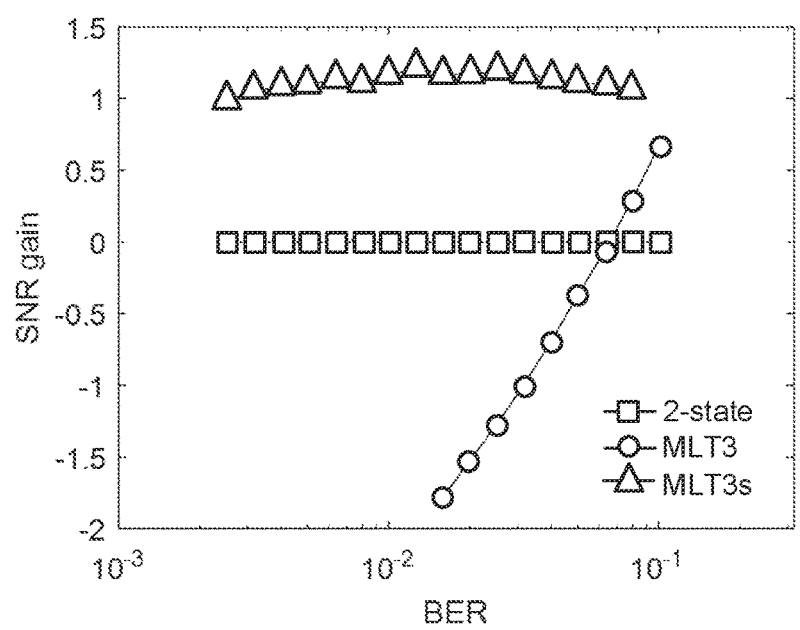
FIG. 13 depicts a plot of the SNR gain versus BER for naive 3-state, MLT-3 and MLT-3s encoding schemes (described in FIGS. 11B-11C, respectively).

FIG. 12 depicts a plot of BER versus SNR for the 2-state, MLT-3 and MLT-3s encoding schemes (described above in FIGS. 11B-11C, respectively). FIG. 13 also depicts a plot of the SNR gain versus BER for the 2-state encoding. MLT-3 and MLT-3s encoding schemes. It is of note that the noise in the system may be attributed, at least in part, to additive white Gaussian noise (AWGN). The same channel equalization target and readback response function was assumed in all channel simulations. As shown in FIG. 12, implementation of the MLT-3s encoding scheme leads to a greater reduction in BER at various SNR values as compared to the 2-state and MLT-3 encoding schemes. Moreover, FIG. 13 further confirms that implementation of the MLT-3s encoding scheme leads to a greater SNR gain than the 2-state and MLT-3 encoding schemes.

Again with reference to FIGS. 2A-2B, the HAMR system 200, and particularly the write head 202 thereof, may be configured to write more than three magnetic configurations/states (e.g., 4, 5, 6, 7, 8, etc. magnetic configurations/states) in each physical bit 240. In particular approaches, each physical bit 240 may have a possible continuum of magnetic configurations/states.

Figures 14A, 14B:
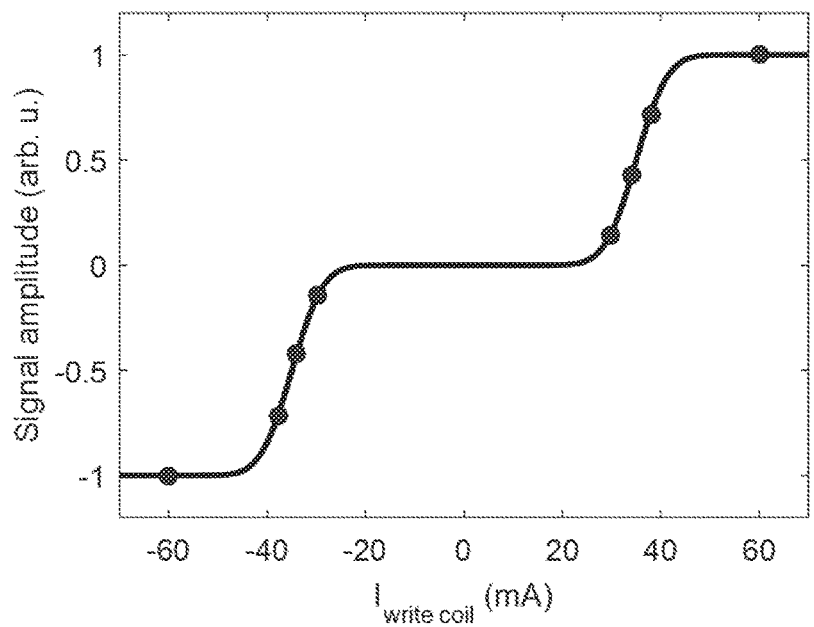
FIGS. 14A-14B depict a first exemplary method for writing 8 magnetic states per physical bit in a HAMR system, according to one embodiment.

FIGS. 14A-14B depict a first exemplary method for writing 8 possible magnetic states per physical bit 240 of a HAMR system (such as the HAMR system 200 of FIGS. 2A-2B), according to one approach. In this first method, a constant current ($I_{laser}$) is applied to the optical radiation source 212 to achieve a desired output power level thereof, and to ultimately enable the NFT 210 to heat the bit 240 to near or above the Curie temperature thereof. Moreover, the write current ($I_o$) may be selected/varied to set the value and polarity (i.e., the magnetic state) of the bit 240. The correlation between the signal amplitude and the write coil current is particularly shown in FIG. 14A. FIG. 14B also depicts a table displaying exemplary values for the current of the optical radiation source and the write coil for 8 state recording.

Figures 15A, 15B:
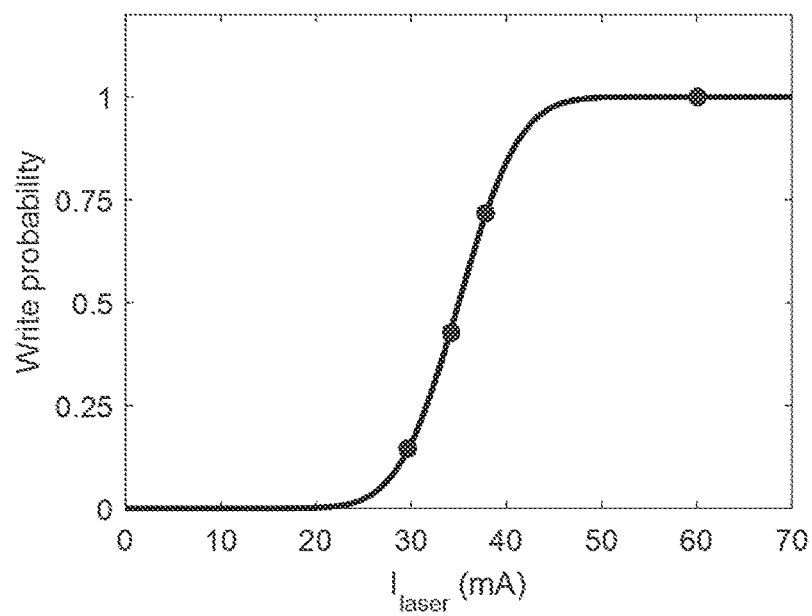
FIGS. 15A-15B depict a second exemplary method for writing 8 magnetic states per physical bit in a HAMR system, according to another embodiment.

FIGS. 15A-15B depict a second exemplary method for writing 8 possible magnetic states per physical bit 240 of a HAMR system (such as the HAMR system 200 of FIGS. 2A-2B), according to another approach. In this second method, both the current applied to the optical radiation source 212 and to the write coils 206 may be selected/varied to achieve a desired magnetic state. In particular, the current ($I_{laser}$) applied to the optical radiation source 212 may be selected/varied to set the value of the bit 240, whereas the write current ($I_o$) may be selected/varied to set the polarity of the bit 240. Accordingly, as shown in the plot of FIG. 15A, the magnetic grain write probability depends on the current amplitude of the optical radiation source. It is of note, that while residual signal from a previously written bit may contribute to the signal at low powers of the optical radiation source 212, this residual signal can be compensated by adjusting said power accordingly. FIG. 15B depicts a table displaying exemplary values for the current of the optical radiation source and the write coil for 8 state recording.

Figures 16A, 16B:
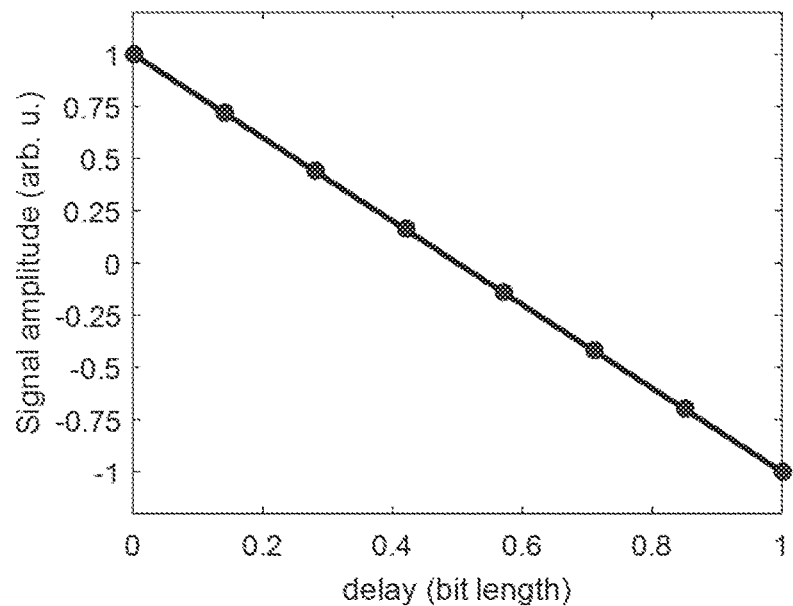
FIGS. 16A-16B depict a third exemplary method for writing 8 magnetic states per physical bit in a HAMR system, according to yet another embodiment.

FIGS. 16A-16B depict a third exemplary method for writing 8 possible magnetic states per physical bit 240 of a HAMR system (such as the HAMR system 200 of FIGS. 2A-2B), according to yet another approach. In this third method, a constant current ($I_{laser}$) is applied to the optical radiation source 212 to achieve a desired output power level thereof, and to ultimately enable the NFT 210 to heat the bit 240 to near or above the Curie temperature thereof. Additionally, this third method involves delaying the switching of the write current phase within the bit 240 to set the value thereof. Stated another way, a delay in the write current switch may be selected so as to write the desired signal amplitude. For instance, as shown in the plot of FIG. 16A, magnetic states in between the +1 and -1 magnetic states may be fractionally written by selecting a particular delay (as measured in bit length) in the write current switch. FIG. 16B depicts a table displaying exemplary values for the write current and write current switch delay for 8 state recording. It is important to note, that the 1-6 magnetic states can only occur after a 0 magnetic state (or a 7 magnetic state) and must be followed immediately by a 7 magnetic state (or a 0 magnetic state).

In the three methods embodied in FIGS. 14(A,B)-16(A,B), 8 magnetic states per physical bit are possible; however, it is also important to note that these methods (and variations thereof that would become apparent to skilled artisans upon reading the present disclosure) may be implemented to write a greater and/or lesser number of magnetic states per physical bit.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

It should also be noted that methodology presented herein for at least some of the various embodiments may be implemented, in whole or in part, in computer hardware, software, by hand, using specialty equipment, etc. and combinations thereof.

Moreover, any of the structures and/or steps may be implemented using known materials and/or techniques, as would become apparent to one skilled in the art upon reading the present specification.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A heat assisted magnetic recording system, comprising:
   a magnetic recording medium comprising a magnetic recording layer, wherein the magnetic recording layer comprises a plurality of physical bits, wherein each physical bit has a perpendicular magnetic anisotropy and one of at least three magnetic states, the at least three magnetic states including a +1 magnetic state, a 0 magnetic state, and a -1 magnetic state,
   wherein each physical bit comprises a plurality of magnetic grains each having a magnetization oriented in a first direction or a second direction, the first and second directions being perpendicular to an upper surface of the magnetic recording layer and antiparallel with respect to one another.

2. The heat assisted magnetic recording system as recited in claim 1, wherein at least one physical bit has the +1 magnetic state, and/or at least one physical bit has the -1 magnetic state.

3. The heat assisted magnetic recording system as recited in claim 1, wherein at least one physical bit has the 0 magnetic state.

4. The heat assisted magnetic recording system as recited in claim 1, wherein the -1 magnetic state of a physical bit corresponds to a state in which at least a majority of the magnetic grains therein have magnetizations oriented in the first direction.

5. The heat assisted magnetic recording system as recited in claim 1, wherein the +1 magnetic state of a physical bit corresponds to a state in which at least a majority of the magnetic grains therein have magnetizations oriented in the second direction.

6. The heat assisted magnetic recording system as recited in claim 1, wherein the 0 magnetic state of a physical bit corresponds to a state in which the magnetic grains therein having magnetizations oriented in the first direction are about equal in number to the magnetic grains therein having magnetizations oriented in the second direction.

7. The heat assisted magnetic recording system as recited in claim 1, further comprising a write head configured to write one of the at least three magnetic states to at least some of the physical bits.

8. A heat assisted magnetic recording system comprising:
  a magnetic recording medium comprising a magnetic recording layer, wherein the magnetic recording layer comprises a plurality of physical bits, wherein each physical bit has a perpendicular magnetic anisotropy and one of at least three magnetic states, the at least three magnetic states including a +1 magnetic state, a 0 magnetic state, and a −1 magnetic state;
  a write head configured to write to at least some of the physical bits for setting the magnetic states thereof;
  a drive mechanism for passing the magnetic recording medium over the write head; and
  a controller electrically coupled to the write head for controlling operation thereof,
  wherein the write head comprises:
    a write coil configured to generate a magnetic field generally perpendicular to the magnetic recording medium;
    a current source coupled to the write coil and configured to generate a write;
    an optical radiation source configured to provide optical radiation at a first output power level; and
    a near field transducer configured to direct the optical radiation from the optical radiation source to the magnetic recording medium to heat the physical bits in the magnetic recording layer thereof.

9. The heat assisted magnetic recording system as recited in claim 8, wherein at least one physical bit has a −1 magnetic state, and wherein the controller is further configured to cause the write head to write the −1 magnetic state of the at least one physical bit by requiring: the current source to generate a write current having a first polarity, and the optical radiation source to provide optical radiation at the first output power level.

10. The heat assisted magnetic recording system as recited in claim 8, wherein at least one physical bit has a +1 magnetic state, and wherein the controller is further configured to cause the write head to write the +1 magnetic state of the at least one physical bit by requiring: the current source to generate a write current having a second polarity, and the optical radiation source to provide optical radiation at the first output power level.

11. The heat assisted magnetic recording system as recited in claim 8, wherein at least one physical bit has a 0 magnetic state, and wherein the controller is further configured to cause the write head to write the 0 magnetic state of the at least one physical bit by requiring: a write current to be about zero, and the optical radiation source to provide optical radiation at the first output power level.

12. The heat assisted magnetic recording system as recited in claim 8, wherein at least one physical bit has a 0 magnetic state, and wherein the controller is further configured to cause the write head to write the 0 magnetic state of the at least one physical bit by requiring: the current source to generate a write current having a polarity opposite to a polarity of the write current used in writing a preceding physical bit, and the optical radiation source to provide optical radiation at a second output power level, the second output power level being about 50% to about 90% of the first output power level.

13. The heat assisted magnetic recording system as recited in claim 8, wherein at least one physical bit has a 0 magnetic state, and wherein the controller is further configured to cause the write head to write the 0 magnetic state of the at least one physical bit by switching a polarity of a write current in about a middle of the physical bit, and requiring the optical radiation source to provide optical radiation at the first output power level.

14. The heat assisted magnetic recording system as recited in claim 8, wherein each physical bit has one of a continuum of magnetic states.

15. The heat assisted magnetic recording system as recited in claim 14, wherein the controller is further configured to cause the write head to write one of the continuum of magnetic states by: selecting an amplitude and a polarity of a write current to set a signal amplitude and magnetization direction of magnetic grains in the physical bit, and requiring the optical radiation source to provide optical radiation at the first output power level.

16. The heat assisted magnetic recording system as recited in claim 14, wherein the controller is further configured to cause the write head to write one of the continuum of magnetic states by: selecting an output power level of the optical radiation source to set a signal amplitude of magnetic grains in the physical bit, and selecting a polarity of a write current to set a magnetization direction of the magnetic grains in the physical bit.

17. The heat assisted magnetic recording system as recited in claim 14, wherein the controller is further configured to cause the write head to selectively write one of the continuum of magnetic states by switching a polarity of a write current after a predetermined delay.

18. The heat assisted magnetic recording system as recited in claim 14, wherein the continuum of magnetic states includes at least 8 magnetic states.

19. A magnetic recording medium, comprising:
  a magnetic recording layer, wherein the magnetic recording layer comprises a plurality of physical bits, wherein each physical bit has a perpendicular magnetic anisotropy and one of at least three magnetic states, the at least three magnetic states including a +1 magnetic state, a 0 magnetic state, and a −1 magnetic state,
    wherein each physical bit comprises a plurality of magnetic grains, and
    wherein the 0 magnetic state of a physical bit corresponds to a state in which the magnetic grains therein having magnetizations oriented in a first direction are about equal in number to the magnetic grains therein having magnetizations oriented in a second direction that is antiparallel to the first direction.

20. The magnetic recording medium as recited in claim 19, wherein each of the magnetic grains has a magnetization oriented in a direction perpendicular to an upper surface of the magnetic recording layer.

21. The magnetic recording medium as recited in claim 19, wherein the −1 magnetic state of a physical bit corresponds to a state in which at least a majority of the magnetic grains therein have magnetizations oriented in the first direction.

22. The magnetic recording medium as recited in claim 21, wherein the +1 magnetic state of a physical bit corresponds to a state in which at least a majority of the magnetic grains therein have magnetizations oriented in the second direction that is antiparallel to the first direction.

23. A magnetic recording system, comprising the magnetic recording medium of claim 19 and a write head configured to selectively write selected magnetic states to the physical bits.

* * * * *